(12) United States Patent
Fukazawa (10) Patent No.: US 7,796,739 B2
(45) Date of Patent: Sep. 14, 2010

(54) PRESENCE MANAGEMENT SYSTEM, PRESENCE NOTIFICATION METHOD, SERVER UNIT, AND TERMINAL DEVICE

(75) Inventor: Shigeru Fukazawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/419,137

(22) Filed: Apr. 6, 2009

(65) Prior Publication Data
US 2009/0268889 A1    Oct. 29, 2009

(30) Foreign Application Priority Data
Apr. 25, 2008    (JP) .............................. 2008-115892

(51) Int. Cl.
*H04M 1/64*    (2006.01)
(52) U.S. Cl. .................... 379/88.17; 370/352; 370/353; 370/354; 370/355; 370/356; 379/88.13; 379/88.14; 379/88.18; 379/201.01; 379/92.01; 379/92.02; 379/92.03; 379/92.04; 379/106.01; 455/404.2; 455/414.1; 455/435.3; 455/456.5; 455/456.6; 709/202; 709/203; 709/206; 709/207; 709/224
(58) Field of Classification Search ......... 370/351–356; 379/88.13, 88.14, 88.17, 88.18, 92.01–92.04, 379/106.01, 201.01; 455/404.2, 414.1, 435.3, 455/456.1–456.6; 709/201–207, 224
See application file for complete search history.

(56) References Cited

U.S. PATENT DOCUMENTS

| | | | |
|---|---|---|---|
| 6,301,609 B1 * | 10/2001 | Aravamudan et al. ....... | 709/207 |
| 7,668,133 B2 * | 2/2010 | Schmidt et al. ............. | 370/328 |
| 2003/0093521 A1 * | 5/2003 | Schlonski et al. ........... | 709/224 |
| 2003/0225843 A1 * | 12/2003 | Sakata ........................ | 709/206 |
| 2004/0240652 A1 | 12/2004 | Kanada | |
| 2006/0195591 A1 * | 8/2006 | Kim et al. .................... | 709/227 |
| 2007/0150605 A1 * | 6/2007 | Christoffersson et al. ... | 709/228 |
| 2008/0108332 A1 * | 5/2008 | Tian et al. ................ | 455/414.1 |

(Continued)

FOREIGN PATENT DOCUMENTS

JP    09-046340    2/1997

(Continued)

OTHER PUBLICATIONS

Notification of Reasons for Rejection with English translation in a corresponding Japanese application, application No. 2008-115892 dated May 26, 2009.

*Primary Examiner*—Hemant Patel
(74) *Attorney, Agent, or Firm*—Blakely, Sokoloff, Taylor & Zafman LLP (57) ABSTRACT

According to one embodiment, a presence management system comprises a server unit and a plurality of terminal devices. The server unit controls a plurality of presentities and a plurality of watchers. The terminal devices may be set to any of the presentities and the watchers for other terminal devices. The server unit includes a database, a reading module and a notification processing module. The database stores a relationship table in which parameters showing relationships to each watcher for each presentity in a table form. The reading module reads each of the parameters of the watchers for presentities of their change sources from the database when changes in presence of the presentities working under the server unit. The notification processing module notifies the presences of the presentities to each watcher for the presentities of the change sources at timing in accordance with the read parameters.

7 Claims, 6 Drawing Sheets

U.S. PATENT DOCUMENTS

| | | | |
|---|---|---|---|
| 2008/0133645 A1* | 6/2008 | Fridman et al. | 709/202 |
| 2009/0070458 A1* | 3/2009 | Fuse et al. | 709/224 |

FOREIGN PATENT DOCUMENTS

| | | |
|---|---|---|
| JP | 2003-271531 | 9/2003 |
| JP | 2004-228833 | 8/2004 |
| JP | 2004-348647 | 12/2004 |
| JP | 2006-119885 | 5/2006 |
| JP | 2006-236346 | 9/2006 |
| JP | 2006-237700 | 9/2006 |
| JP | 2006-285782 | 10/2006 |
| JP | 2007-264769 | 10/2007 |
| JP | 2008-242734 | 10/2008 |
| JP | 2009-049820 | 3/2009 |
| WO | 2006/112381 A1 | 10/2006 |
| WO | WO2006112381 | 10/2006 |
| WO | WO2008073009 | 6/2008 |
| WO | WO2008139566 | 11/2008 |

* cited by examiner

|   | A | B | C | D | M | N | O |
|---|---|---|---|---|---|---|---|
| A | 1 | 2 | 5 | 5 | 3 | 4 | 4 |
| B | 2 | 1 | 3 | 2 | 2 | 3 | 4 |
| C | 5 | 3 | 1 | 2 | 4 | 2 | 2 |
| D | 5 | 2 | 2 | 1 | 3 | 4 | 2 |
| M | 3 | 2 | 4 | 3 | 1 | 2 | 2 |
| N | 4 | 3 | 2 | 4 | 2 | 1 | 2 |
| O | 4 | 4 | 2 | 2 | 2 | 2 | 1 |

Relationship list 35a

PRESENCE MANAGEMENT SYSTEM, PRESENCE NOTIFICATION METHOD, SERVER UNIT, AND TERMINAL DEVICE

CROSS-REFERENCE TO RELATED APPLICATIONS

This application is based upon and claims the benefit of priority from Japanese Patent Application No. 2008-115892, filed Apr. 25, 2008, the entire contents of which are incorporated herein by reference.

BACKGROUND

1. Field

One embodiment of the present invention relates to a presence management system enabling management of presences of users via a network, a presence notification method, a server unit, and a terminal device for use in the system.

2. Description of the Related Art

There is a service capable of sharing conditions of users in a network as one of services using an Internet Protocol (IP) network. Presences showing the conditions of users (online, offline, during telephone call, during leaving seat, during sitting on seat, etc.) are stored in a database to be managed. A user or a terminal who (that) is "a presenter of a presence" is referred to as a presentity, and a user (or a terminal) who (that) is "a browser of a presence" is referred to as a watcher.

When the conditions of the presentities vary, the fact is immediately notified to the presence server. The presence server which received the notice notifies the changes in condition of the presentities to the watchers; however, the presence server has to pay attention the timing of the notice. It is not preferable to notify the changes in condition to all the watchers at a time, because a network load and a processing load become heavy suddenly. It is all the more not preferable if the number of the watchers is large.

Jpn. Pat. Appln. KOKAI publication No. 2006-285782 has disclosed a technique for reducing the load in such a kind of system. This patent document reduces the load by not transmitting and receiving useless messages among clients and a server. However, messages described in this document mean e-mails and text data, and not messages (e.g., session initiation protocol [SIP] messages) related to the notification itself of the presences. That is, this document only has disclosed processing in an upper-layer on the assumption that the notification of the presences inter-terminal has been completed. It has been desired to reduce the load related to the transmission and reception of the messages among the presentities and the watchers in a lower-layer.

In addition, there is a technique for the watchers, like mail clients, to distribute the load by periodically requesting for presence acquisition to the server. Internet Engineering Task Force (IETF) defines to notify only difference information of the change in presence from the presence server to the watchers. However, neither of the aforementioned techniques are not drastic measures for a load distribution.

As described above, the existing presence management system is apt to increase the Toad on a system including a network and a computer facility in notifying the presence information to the watchers from the presence server. Although staggering the timing of the notice for each watcher is a possible approach, a further polished method has been desired.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a presence management system comprising a server unit which controls a plurality of presentities and a plurality of watchers; and a plurality of terminal devices which may be set to any of the presentities and the watchers for other terminal devices The server unit includes: a database which stores a relationship table in which parameters showing relationships to each watcher for each presentity in a table form; a reading module which reads each of the parameters of the watchers for presentities of their change sources from the database when changes in presence of the presentities working under the server unit; and a notification processing module which notifies the presences of the presentities to each watcher for the presentities of the change sources at timing in accordance with the read parameters.

By taking such measures, for each terminal device, parameters (e.g., priority order) to a plurality of watchers in setting the terminals as presentities are defined in advance and stored in a database. For instance, if a certain presentity has three watchers, the priority order is decided among the watchers in advance. The priority order may be decided by reflecting an organization structure of a presence management system in such a way in which the priority order is decided whether or not the watchers belong to the same group, or the priority order is decided in response to hierarchized class levels.

As the presences of the presentities have varied, the presences are distributed not all at once but sequentially to each watcher at timing in accordance with the parameters. Therefore, like the existing technique, a sudden system load accompanied by simultaneous distributions may be reduced. Further, this presence management system may achieve presence notification corresponding to the organization structure. Thus, the presence management may be achieved in a further polished way.

Figure 1:
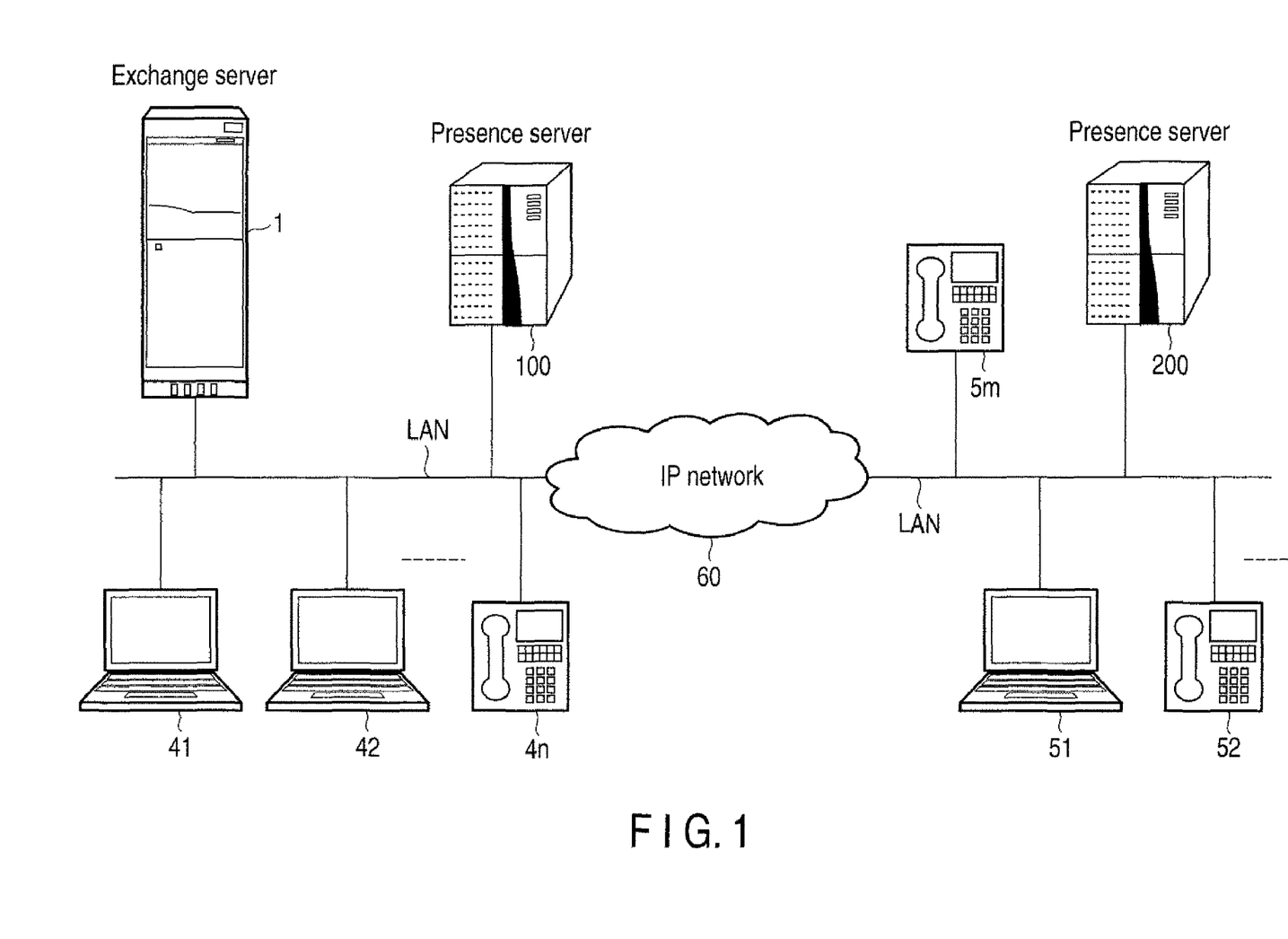
FIG. 1 is an exemplary system view depicting an embodiment of a presence management system of the invention.

According to an embodiment, FIG. 1 shows an exemplary system view illustrating an embodiment of a presence management system of the invention. In this embodiment, a so-called voice over IP (VoIP) system is exemplified, which achieves voice communication by transmitting and receiving IP packets via an IP network 60. In the system of FIG. 1, it is assumed that an SIP is used as a main protocol.

In FIG. 1, local networks to be formed at each different base are connected via the IP network 60. Each local network has a plurality of terminals to be connected via LANs. An exchange server 1, a presence server 100 and a plurality of IP terminals 41-41n are connected to one LAN among the LANs. Among the IP terminals 41-41n, the IP terminals 41, 42 are, for example, personal computer (PC) terminals, and the IP terminal 4n is an IP telephone set, and each of them includes an SIP processing function and a VoIP communication function.

A presence server 200 and a plurality of IP terminals 51-5m are connected to the other LAN. The IP terminal 51 is, for example, the PC terminal, and the IP terminals 52, 5m are, for example, IP telephone sets. The exchange server 1 controls extension communication at each LAN and outside line communication via the IP network 60.

In the system of FIG. 1, the presence server 100 controls the IP terminals 41-4n and IP terminals 51-5m, and integrally controls the presences of the users of these terminals. Each IP terminal may be set as any of a presentity and a watcher in relationships to other IP terminals. Information showing "which of the watchers have made reservations for the notification of the presences of which of the presentities" is stored in a database in advance and registered in the system.

Figure 2:
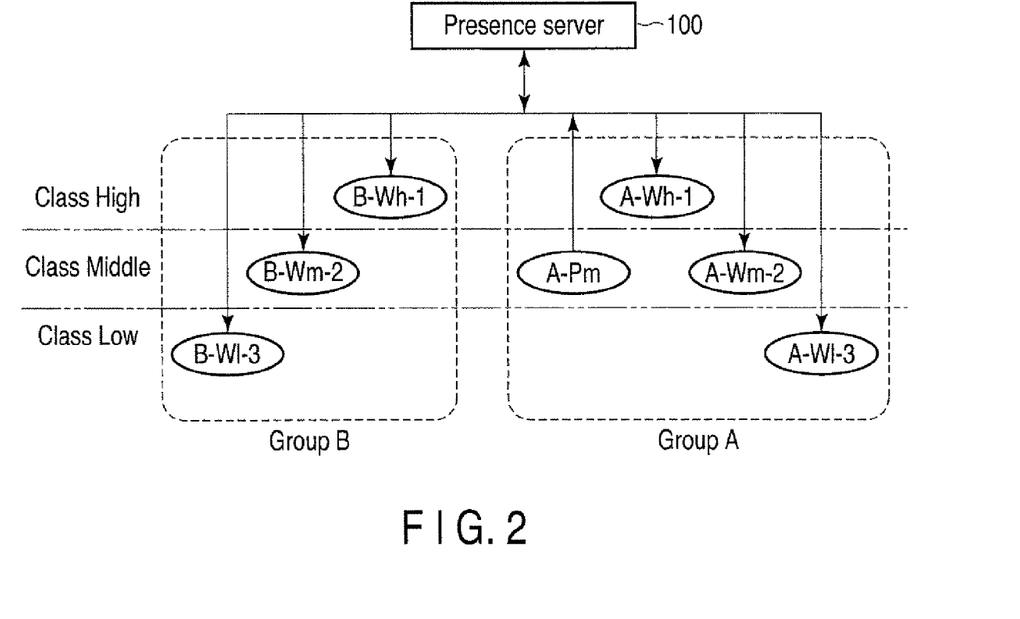
FIG. 2 is an exemplary schematic view depicting an example of relationships among watchers and presentities in the system of FIG. 1.

According to an embodiment, FIG. 2 shows an exemplary schematic view illustrating an example of relationships among the watchers and the presentities in the system of FIG. 1. In FIG. 2, any object designated as symbols A-Pm, A-Wh-1, B-Wl-3, etc., is the IP terminal of FIG. 1, and each of them is controlled by the presence server 100. A subscript P in the symbol indicates the presentity and a subscript W therein indicates the watcher. In FIG. 2, setting in which other terminals monitor the presence of the presentity A-Pm as watchers is indicated by means of the direction of an arrow mark.

In this embodiment, each IP terminal is organized from two view points. A first view point is based on a group distinguished by subscripts A, B, adds the subscript A to the terminals belonging to a Group A, and adds the subscript B to the terminals belonging to a Group B. Each group is equivalent, for example, to each LAN of FIG. 1, or a group may be set by associating with each division in an office as a business section, design section, and so on.

The second view point is based on a class hierarchical structure distinguished by subscripts h, m, 1. The subscripts h, m, 1 each indicates a "Class High", a "Class Middle", and a "Class Low". In FIG. 2, the presentity A-Pm belongs to the "Class Middle". The "Class Middle" also includes watchers A-Wm-2, B-Wm-2. Watchers A-Wh-1, B-Wh-2 belong to the "Class High" which is higher than the "Class Middle". Watchers A-Wl-3, B-Wl-3 belong to the "Class Low" which is lower than the "Class Middle". This classification may be associated, for example, with posts in the office. The higher the post is, the higher priority may be given by associating with the higher classes from the "Class Low" to the "Class High". Numbers 1, 2, . . . , x, of subscripts are serial numbers.

When its own presence has changed, the presentity A-Pm transmits the changed presence information to the presence server 100 through a "PUBLISH" message or the like. The presence server 100 receives and decodes the message. The presence server 100 updates the presence of the presentity of a change source on the database. In this way, the presence server 100 manages the presences of the IP terminals under its own control in real time. The watchers A-Wh-1, A-Wm-2, A-Wl-3, B-Wh-l, B-Wm-2 and B-Wl-3 acquire and refer the presence of the presentity A-Pm from the presence server 100.

In FIG. 2, the presentity A-Pm and the watchers A-Wh-1, A-Wm-2, A-Wl-3 belong to the Group A. The Watchers B-Wh-1, B-Wn-2, B-Wl-3 belong to the Group B. The watchers A-Wh-1, B-Wh-1 are set in the "Class High", the presentities A-Pm, the watchers A-Wm-2, B-Wm-2 are set in the "Class Middle", and the watchers A-Wl-3, B-Wm-3 are set in the "Class Low". The class hierarchical structure is not limited to a structure having three stages therein, and the number of the groups is not limited two of A, B.

Figure 3:
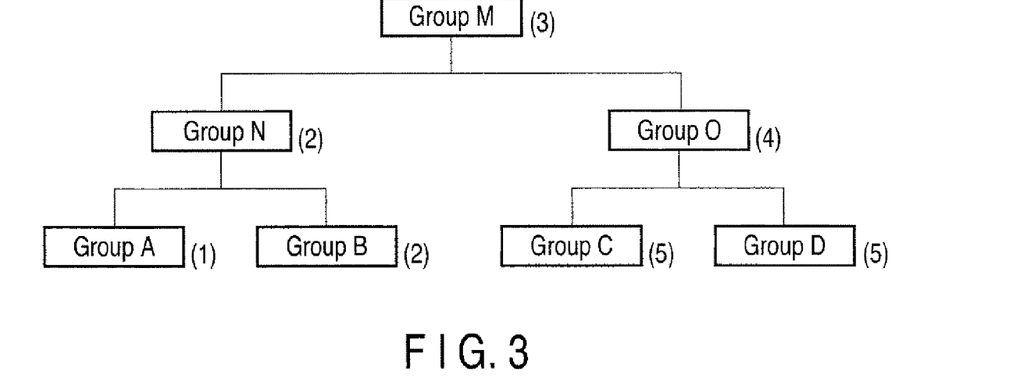
FIG. 3 is an exemplary schematic view depicting an example of relationships among a plurality of groups.

According to an embodiment, FIG. 3 shows an exemplary schematic view illustrating an example of a plurality groups and their relationships. FIG. 3 shows relationships among groups of seven groups of a Group A-a Group D and a Group M-a Group O in a tree structure. Numeric values (1)-(5) indicated by adding to each group indicates relationship values. The relationship values are indexes to be newly introduced in this embodiment. The relationship values are parameters indicating the degrees of nearness, and the closer the relationships are, the smaller the number becomes. The distances of relationships are arbitrary set in response to a system operation.

FIG. 3 shows relationships to other groups viewed from the Group A. For instance, the Group B in parallel with the Group A is associated with the Group A by the relationship value (2). The relationship value (2) is also set to a Group N positioned at a just above of the Group A. Groups C, D to which the relationship values (5) are set have the most distant relationships to the Group A. The smallest relationship value (1) is set to the Group A that is its own group.

The relationship values shown in FIG. 3 show the relationships among the presentities and the watchers in groups. For instance, the presentities in the Group A are associated with the watchers in the Group B and the relationship value (2). The relationships to other groups viewed from other Groups B-O may be arbitrary set, and may be managed in a manner shown in a list.

Figure 4:
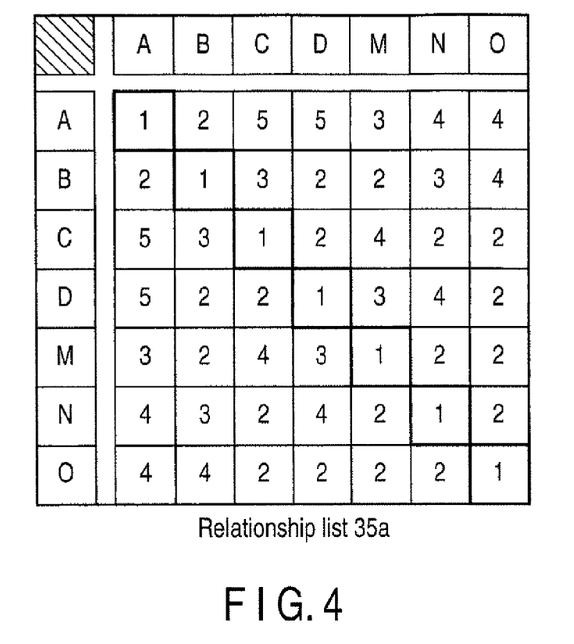
FIG. 4 is an exemplary view depicting an example of a relationship list 35*a* to be stored in a database unit DB of FIG. 2.
Figure 5:
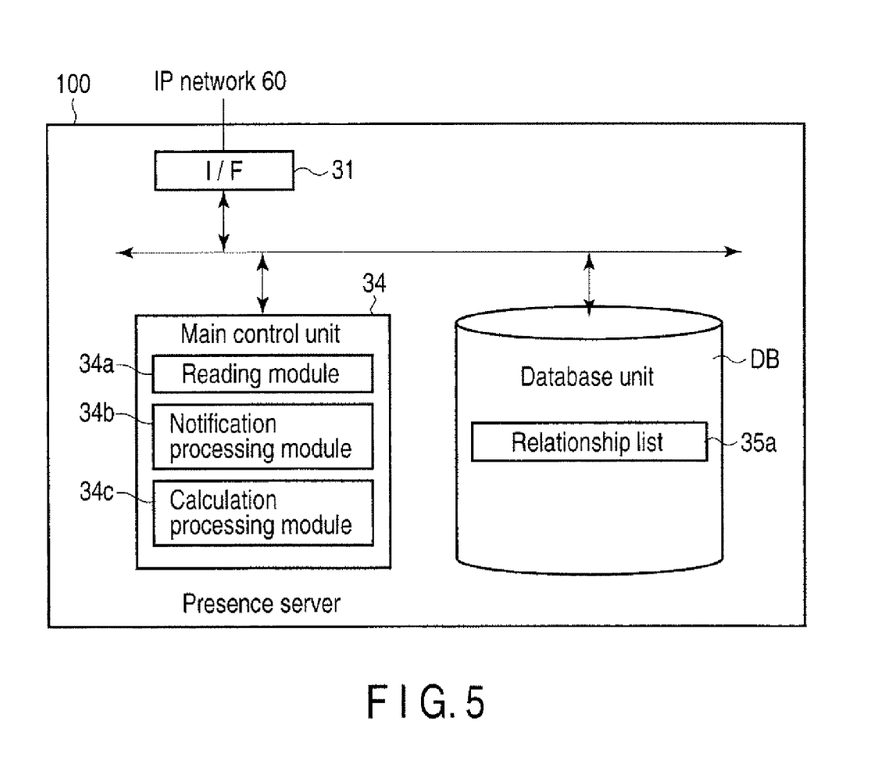
FIG. 5 is an exemplary functional block diagram depicting embodiments of presence servers 100, 200.

According to an embodiment, FIG. 4 shows an exemplary schematic view illustrating relationship values indicating relationships among groups in a table. This table is referred to as a relationship list. In this list, group names are arranged vertically and horizontally as A-O, relationship values indicating the relationships among two groups is described at intersecting points of each group. For instance, the numeric value (5) is positioned at the intersecting point of the Groups A, D, and this situation corresponds to FIG. 3, According to an embodiment, FIG. 5 shows an exemplary functional block view illustrating the embodiment of the presence server 100 of FIG. 1. The presence server 200 is configured similarly. The presence server 100 includes an interface unit 31, a database unit DB, and a main control unit 34. Among of them, the interface unit 31 is connected to the IP network 60 to perform processing of transmission and reception of packets. The Database unit DB is a storage device such as a hard disk recorder to store the relationship list 35a of FIG. 4.

Meanwhile, the main control unit 34 includes a reading module 34a, a notification processing module 34b and a calculation processing module 34c as a processing function regarding the embodiment. When being notified the change in presence from the presentities working under the reading module 34a, the reading module 34a reads the relationship values of each watcher to the presentities of the change sources from the relationship list 35a. For instance, detecting the change in presence of the presentity A-Pm of FIG. 2, the reading module 34a acquires the relationship value (2) from the list 35a. The value (2) is the relationship value of the Group B to which the watcher of the presentity A-Pm belongs. In other words, while the watcher of the presentity A-Pm belongs Group B (shown in FIG. 2), detecting the change in presence of the presentity A-Pm, the reading module 34a acquires the relationship value (2) from the list 35a.

The processing module 34b notifies the presences of the change source presentities to each watcher of the change source presentities. The processing module 34b notifies the presences to the watchers at the timing varying on the basis of the read relationship values. The timing is calculated by the processing module 34c.

The processing module 34c calculates the timing of the notification to each watcher by means of the processing module 34b on the basis of the read relationship values. The processing unit 34c uses a calculation formula by which the watchers closer to the relationships to the change source presentities become earlier in a temporal sequence, and calculates the notification timing by substituting the relationship values into the formula.

In addition, the control unit 34 has the processing function of registering the presences notified from each of the presentities, and receiving reservations of presence notification from the watchers working under the control unit 34. The following will describe operations of the system of the aforementioned configuration.

First Embodiment

Figure 6:
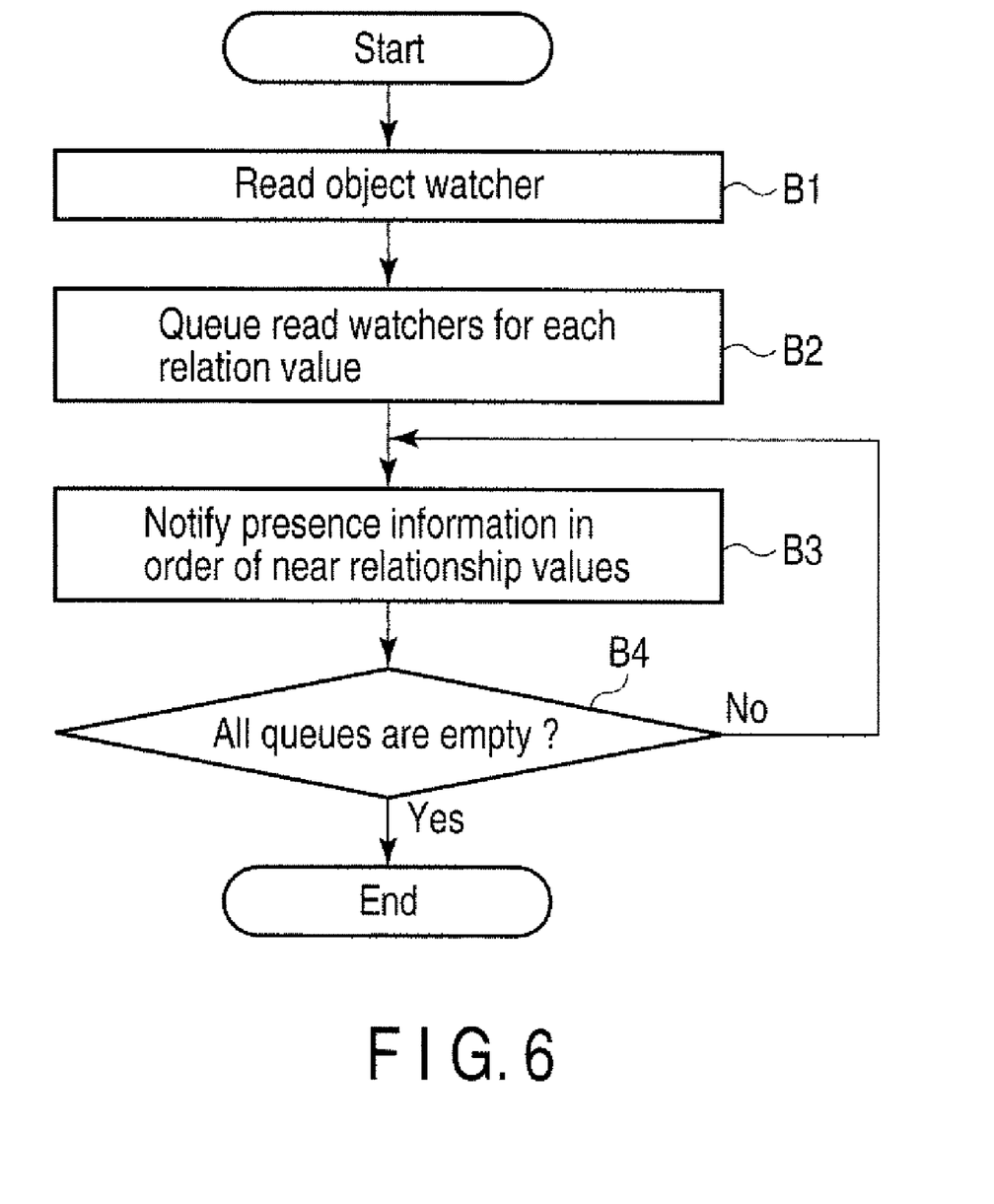
FIG. 6 is an exemplary flowchart depicting a first embodiment of a processing procedure regarding presence notification.

FIG. 6 is an exemplary flowchart illustrating a first embodiment of a processing procedure regarding presence notification. When a change in presence is notified from the presentity, the presence server 100 reads the relationship values associating the watchers watching the presentities of the change sources and each of the presentities from the database DB (Block B1).

Then the presence server 100 sorts into queues of the same transmission objects for each watcher of which the read relationship values are the same. That is, the server 100 queues the read watchers for each relationship (Block B2). The server 100 then sequentially reads watchers from the transmission object queue with the closest relationship, namely from the queue with the smallest relationship value to transmit presence information to the read watchers (Block B3). The processing in Block B3 is continued until the queues of the same transmission objects become empty, and when all the queues are emptied, the processing is terminated (loop in Block 4). The procedure of FIG. 6 will be described for each (organization by grouping) and (organization by classification) hereinafter.

(Organization by Grouping)

When the presence of the presentity A-Pm belonging to the Group A of FIG. 2 has changed, the presence server 100 reads watchers registered as notification objects for the presence information of the presentity A-Pm. According to FIG. 2, all other terminals are the watchers of the presentity A-Pm. Since the relationship values to the watchers in the Group A are (1), the presence information is immediately notified to the watchers A-Wh-1, A-Wm-2, A-Wl-3. Since the relationship values to the watchers in the Group B are (2), the next time, the presence information is notified to the watchers B-Wh-1, B-Wm-2, B-Wl-3. In this way, the presence information is notified step by step on the basis of the relationship values of the groups to which the watchers belong.

(Organization by Classification)

Figure 7:
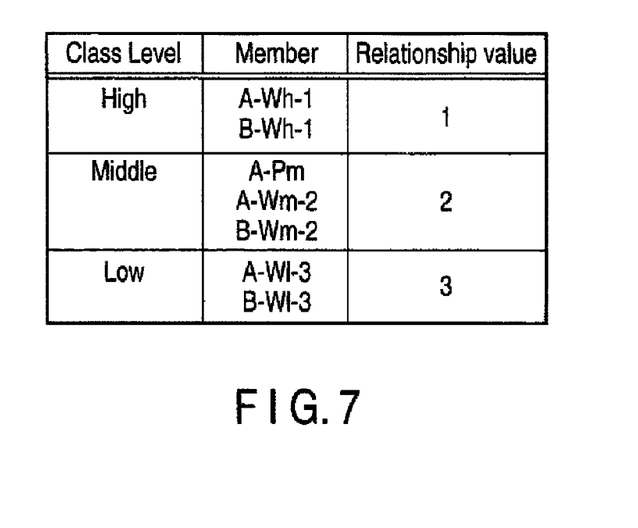
FIG. 7 is an exemplary view depicting an example of a relationship list with relationship values and members for each class registered therein.

In this example, the presence server 100 stores a relationship list shown in FIG. 7 in a database DB. The relationship list defines relationship values for each class hierarchy, and registers members belonging to a class together with the values. The list in FIG. 7 is a table in which the relationship values showing the relationships with the watcher of each class for each of the presentities are associated together in classes.

When the presence of the presentity A-Pm belonging to the "Class Middle" of FIG. 2 has varied, the presence server 100 reads the watchers registered as notification objects of the presence information of the presentity A-Pm. The server 100 then refers to the table of FIG. 7 to read the relationship values among the presentity A-Pm and each watcher. In this example, the watchers A-Wh-1, B-Wh-1 are sorted into a first queue, the watchers A-Wm-2, B-Wm-2 are sorted into a second queue, and the watchers A-Wl-3, B-Wl-3 are sorted into a third queue. Then, the server 100 reads the watchers from the queue in accordance with the order of classes to sequentially transmit the presence information.

The timing to transmit the queued presence information from the server 100 is calculated by the calculation processing module 34c. The timing is defined, for example, in accordance with the following formula [1]. In the formula [1], it is assumed that after [T] seconds from a time point at which a change in presence has been notified from the presentity, the server 100 notifies the presence information to the object watcher.

$$T \text{ sec} = [(\text{relationship value of presentity}) \times (\text{relationship value of watcher}) - 1] \quad [1]$$

For instance, according to FIG. 3, the presentity A-Pm and the watcher B-Wm-2 on the Group B in FIG. 2 are combined with the relationship values (1), (2). When substituting the relationship values (1), (2) into the formula [1], since the formula [1] becomes 1×2−1=1, the presence information is notified to the watcher B-Wm-2 after 1 second. Since T=0 is satisfied in the formula [1] for the Group A, the presence information is notified immediately. Like this way, the "−1" term of the formula [1] has a meaning if the groups are the same as each other, the notification is performed immediately.

As mentioned above, in this embodiment, a plurality of watchers for each of the presentities are grouped or classified in advance. For each group (or class), parameters (relationship values) indicating the nearness of the relationships to the presentities are stored in a table in advance to be stored in the presence server 100. When receiving notification of presence update from the presentities, the server 100 reads the relationship values from the table to notify the presences in order of watchers of which the relationships are close to the read relationship values.

Since the embodiment is configure like this, the presences of the presentities are notified at time intervals for each watcher. Therefore, the loads of the network resources may be distributed. The loads of the presence server 100 may distributed temporarily. Thus an overall system load may be reduced.

Further, according to the first embodiment, the organization structure such as a group and a class may be reflected to order of notification of the presences. Therefore it becomes able to immediately notify the change in presence to board members who desire to receive messages quickly, and operate to sequentially reduce immediacy in response to their posts. The embodiment makes it possible to achieve presence notification in such a refined form.

Second Embodiment

Figure 8:
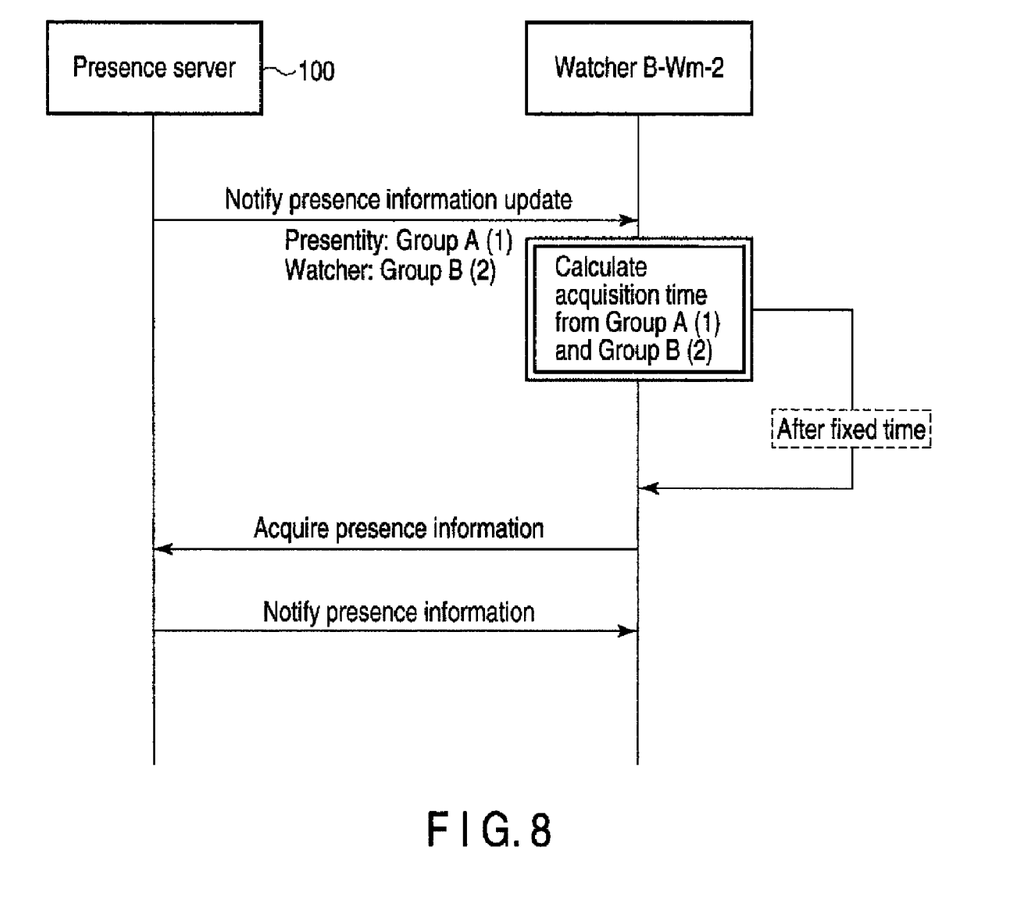
FIG. 8 is an exemplary flowchart depicting a second embodiment of the processing procedure regarding the presence notification.

FIG. 8 shows an exemplary flowchart illustrating a second embodiment of the processing procedure regarding the presence notification. In this embodiment, the watchers voluntarily acquire presence information from the presence server 100.

The presence server 100 which has been notified a presence change from the presentity A-Pm notifies a fact that "the presence has changed" to the watcher B-Wm-2. More specifically the server 100 describes the fact, the relationship value (Group A [1]), and a relationship value (Group B [2]) in a presentity information update notification message to notify the message to the watcher B-Wm-2. The message may be notified through a packet amount which is smaller than that of the presence information itself.

The watcher B-Wm-2 which has received the message calculates the acquisition time T from the relationship values (1), (2) by using the formula [1]. The acquisition time T is a time period from when the watcher B-Wm-2 has received the presentity information update notification message until the watcher B-Wm-2 transmits the acquisition request for the presence to the server 100. After the elapse of the time T, the watcher B-Wm-2 transmits the acquisition request though the "SUBSCRIBE" message or the like. In answer to this request, the server 100 notifies the presence information to the watcher B-Wm-2.

In this way, in the second embodiment, the system implements the function of the calculation processing module 34c on an IP terminal side. The server 100 notifies the relationship value to the watchers, and the watchers acquire the presence information at the acquisition timing decided on the sides of the watchers. Thereby, the system may reduce the packet amount to be transmitted and received to and from the presentities, the presence server 100 and the watchers, and may further reduce the system burden.

Third Embodiment

Figure 9:
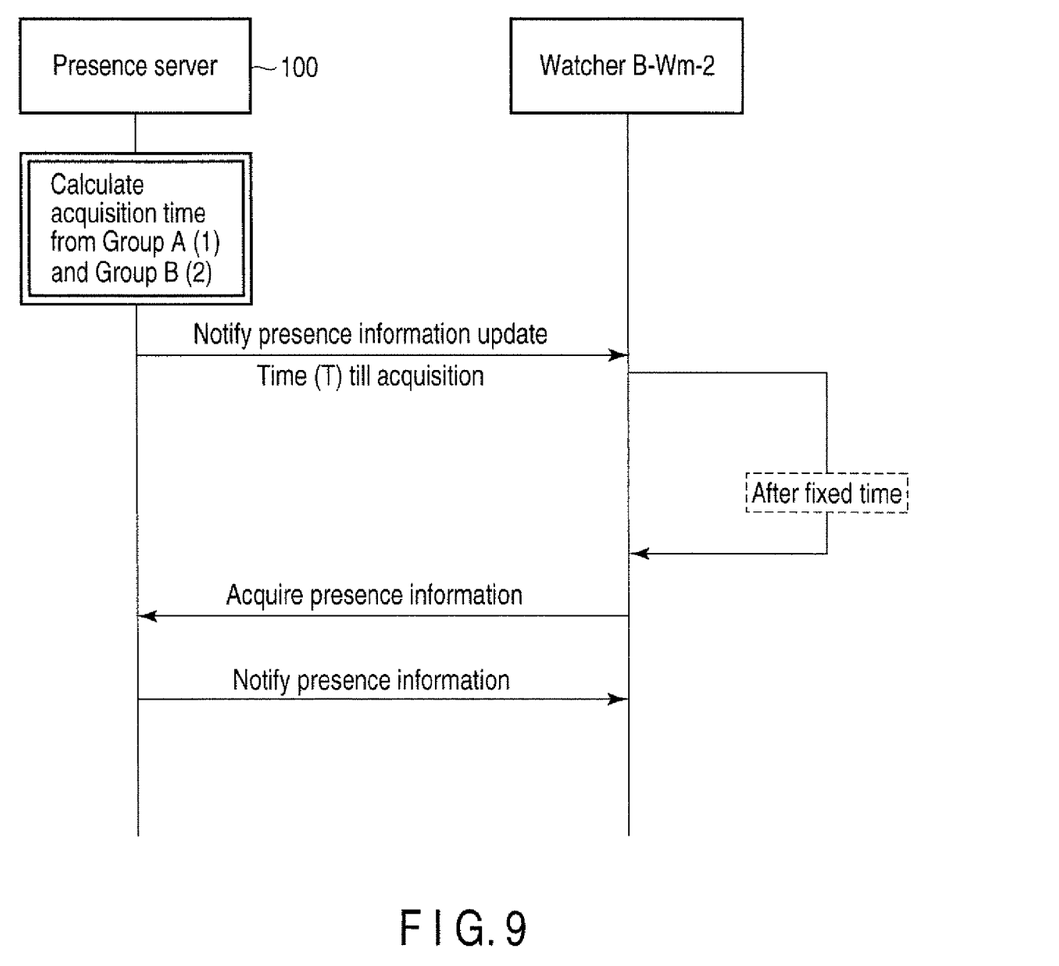
FIG. 9 is an exemplary flowchart depicting a third embodiment of the processing procedure regarding the presence notification.

FIG. 9 is an exemplary flowchart illustrating a third embodiment of the processing procedure regarding the presence notification. In this embodiment, the presence server 100 calculates the acquisition time T. The server 100 describes the acquisition time T in the presence information update notification message to notify the message to the watcher B-Wm-2. The watcher B-Wm-2 which has received this message transmits the acquisition request to the server 100 after the elapse of the acquisition time T from the reception of the message. The server 100 notifies the presence information to the watcher B-Wm-2 in response to the request. Thereby, the system may further reduce the packet amount of the presence information update notification message, and may further reduce the system burden.

As mentioned above, according to each embodiment, for notifying the presence information to the plurality of watchers, the burden on the presence server 100 and the network may be distributed. Furthermore, since the presences may be notified in accordance with the organization structure, each embodiment may not only distribute its burden but also may obtain polished structure. Thus, a presence management system, a presence notification method, a server unit and a terminal device which may effectively reduce the burden on a system regarding the notification of the presence information can be provided.

The invention is not limited to the embodiments of the above. For instance, setting a threshold for the relationship value, and not transmitting the presence information to a group which is away from (or close to) the threshold is a possible approach. This approach may enhance confidentiality of the presence information. In addition, the system may not transmit the presence information to any watcher belonging to a class which is lower than the class of the presentity.

While the sequences in FIGS. 8, 9 notify only the relationship values regarding the groups, in stead of this, it is also able to notify the relationship values showing the relationships among classes. Further, the presence server 100 may notify the relationship values both groups and classes to the watchers.

The relationship list in which the relationship values are stored in a table form may be provided for the sides of the IP terminals. Thus, the packet amount regarding the transmission and reception of the messages may be further reduced.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions The accompanying claims and their equivalents are intended to cover such forms or modifications as would fall within the scope and spirit of the inventions.

What is claimed is:

1. A presence management system comprising:
a plurality of terminal devices which may be set as any of presentities and watchers; and
a server unit which manages the presence of the terminal devices, wherein
the server unit includes:
a database configured to store a relationship table in which parameters showing relationships to each watcher for each presentity in a table form;
a reading module configured to read each of the parameters of the watchers for presentities of their change sources from the database when detecting changes in presence of the presentities;
a parameter notifying module configured to notify the read parameters to each watcher for the presentities of the change sources; and
a module configured to notify the presences of the presentities to the watchers of request sources in response to acquisition requests; and
the plurality of terminal devices includes:
a calculation processing module configured to substitute the parameters into a calculation formula in which watchers, having relationships closer to the presentities of the change sources, have priorities in temporal order to calculate acquisition timing when the parameters have been notified; and an acquisition processing module configured to transmit the acquisition requests to the server unit at the calculated acquisition timing.

2. The system of claim 1, wherein
the plurality of terminal devices are grouped into a plurality of groups; and
the relationship table is a table in which parameters showing relationships to watchers belonging to each of the plurality of groups are associated in groups for each presentity.

3. The system of claim 1, wherein
the plurality of terminal devices are hierarchized in a plurality of classes differing in priority from one another; and
the relationship table is a table in which parameters showing relationships to watchers belonging to each of the plurality of groups are associated in groups for each presentity.

4. A presence notification method in which a server unit, managing presences of a plurality of terminal devices to be set as any of presentities and watchers, notifies the presences of the presentities to the watchers, comprising:
storing a relationship table in which parameters showing relationships to each watcher for each presentity in a table form in the server unit;
acquiring, by the server unit, each of the parameters of the watchers for presentities of their change sources from the database when detecting changes in presence of the presentities;
notifying, by the server unit, the acquired parameters to each watcher for the presentities of the change sources;
calculating, by the terminal device which has been notified the parameters, acquisition timing by substituting the parameters into a calculation formula in which watchers, having relationships closer to the presentities of the change sources, have priorities in temporal order;
transmitting, by the terminal device, an acquisition request to the server unit at the calculated acquisition timing; and
notifying, by the server unit, the presences of the presentities to the watchers of request sources in response to the acquisition requests.

5. The method of claim 4, wherein
the plurality of terminal devices are grouped into a plurality of groups; and
the relationship table is a table in which parameters showing relationships to watchers belonging to each of the plurality of groups are associated in groups for each presentity.

6. The method of claim 4, wherein the plurality of terminal devices are hierarchized in a plurality of classes differing in priority from one another; and
the relationship table is a table in which parameters showing relationships to watchers belonging to each of the plurality of groups are associated in groups for each presentity.

7. A terminal device to be managed its presence by a server unit which manages the presence and may be set as any of presentities and watchers, comprising:
a calculation processing module configured to calculate acquisition timing, when being notified parameters showing relationships to each watcher for the presentities of which presence have been changed, by substituting the parameters into a calculation formula in which watchers, having relationships closer to the presentities of the change sources, have priorities in temporal order; and
an acquisition processing module configured to transmit the acquisition requests to the server unit at the calculated acquisition timing.

\* \* \* \* \*